(12) United States Patent
VanHoose et al.

(10) Patent No.: US 10,077,856 B2
(45) Date of Patent: Sep. 18, 2018

(54) PIPE WITH AN OUTER WRAP

(71) Applicant: Advanced Drainage Systems Inc., Hilliard, OH (US)

(72) Inventors: Bill Russell VanHoose, Findlay, OH (US); Nicholas James Piazza, Findlay, OH (US); Ronald Robert Vitarelli, Marlborough, CT (US); Owen Michael Atchison, Van Buren, OH (US); Tyler James Frost, Upper Sandusky, OH (US)

(73) Assignee: ADVANCED DRAINAGE SYSTEMS INC., Hilliard, OH (US)

( * ) Notice: Subject to any disclaimer, the term of this patent is extended or adjusted under 35 U.S.C. 154(b) by 0 days.

(21) Appl. No.: 15/671,785

(22) Filed: Aug. 8, 2017

(65) Prior Publication Data
US 2017/0336000 A1 Nov. 23, 2017

Related U.S. Application Data

(63) Continuation-in-part of application No. 14/732,146, filed on Jun. 5, 2015, now Pat. No. 9,759,354.

(51) Int. Cl.
| | |
|---|---|
| *F16L 9/00* | (2006.01) |
| *F16L 11/115* | (2006.01) |
| *F16L 11/15* | (2006.01) |
| *F16L 9/133* | (2006.01) |
| *B29C 63/02* | (2006.01) |

(Continued)

(52) U.S. Cl.
CPC ......... *F16L 11/115* (2013.01); *B29C 47/0035* (2013.01); *B29C 47/0057* (2013.01); *B29C 47/021* (2013.01); *B29C 47/1036* (2013.01); *B29C 47/1045* (2013.01); *B29C 63/0004* (2013.01); *B29C 63/0073* (2013.01); *B29C 63/02* (2013.01); *F16L 9/06* (2013.01); *F16L 9/133* (2013.01); *F16L 11/15* (2013.01); *F16L 58/1063* (2013.01); *B29C 47/0038* (2013.01);
(Continued)

(58) Field of Classification Search
CPC ............... F16L 25/0054; F16L 25/0063; F16L 25/0036; F16L 9/00; F16L 9/06; F16L 57/00
USPC .................................. 138/121, 173, 122, 174
See application file for complete search history.

(56) References Cited

U.S. PATENT DOCUMENTS

| | | | |
|---|---|---|---|
| 3,646,610 A | | 2/1972 | Jackson |
| 3,872,893 A | * | 3/1975 | Roberts ............... B29C 47/0023 |
| | | | 138/121 |

(Continued)

FOREIGN PATENT DOCUMENTS

| | | |
|---|---|---|
| GB | 550448 A | 1/1943 |
| WO | WO 1994/28694 A1 | 12/1994 |
| WO | WO 2005/063465 A1 | 7/2005 |

*Primary Examiner* — Patrick F Brinson
(74) *Attorney, Agent, or Firm* — Finnegan, Henderson, Farabow, Garrett & Dunner, L.L.P.

(57) ABSTRACT

This disclosure relates generally to corrugated pipe, and more particularly to corrugated pipe with a reinforcing stiffener. The corrugated pipe may include an axially extended bore defined by a corrugated outer wall having axially adjacent, outwardly-extending corrugation crests, separated by corrugation valleys. In some embodiments, a stiffener may be positioned within the corrugation valleys. In other embodiments, a stiffener may be positioned within the corrugation crests.

23 Claims, 13 Drawing Sheets

(51) Int. Cl.
  *B29C 63/00*   (2006.01)
  *B29C 47/00*   (2006.01)
  *B29C 47/02*   (2006.01)
  *B29C 47/10*   (2006.01)
  *F16L 58/10*   (2006.01)
  *F16L 9/06*    (2006.01)
  *B29K 309/08*  (2006.01)
  *B29L 23/18*   (2006.01)

(52) U.S. Cl.
  CPC ....... *B29K 2309/08* (2013.01); *B29L 2023/18* (2013.01)

(56) References Cited

U.S. PATENT DOCUMENTS

| | | | |
|---|---|---|---|
| 4,053,269 A | | 10/1977 | Levy |
| 4,269,234 A | * | 5/1981 | Johnson ............. F16L 58/1009 138/121 |
| 4,456,034 A | * | 6/1984 | Bixby ................... F16L 11/118 138/103 |
| 4,620,569 A | * | 11/1986 | von Glanstatten ... F16L 11/081 138/121 |
| 4,751,799 A | | 6/1988 | Ditcher et al. |
| 5,354,521 A | | 10/1994 | Goodman |
| 5,390,704 A | * | 2/1995 | Kanao ...................... F16L 9/12 138/121 |
| 5,678,610 A | | 10/1997 | Scarazzo |
| 5,705,351 A | | 1/1998 | Sahasrabudhe |
| 5,848,618 A | * | 12/1998 | Guest ..................... F16L 11/04 138/121 |
| 5,914,163 A | | 6/1999 | Browne |
| 5,975,143 A | * | 11/1999 | Jarvenkyla ............. B29C 53/30 138/121 |
| 6,186,183 B1 | | 2/2001 | Lepoutre |
| 6,315,715 B1 | * | 11/2001 | Taylor ................... A61B 1/018 138/122 |
| 6,399,002 B1 | | 6/2002 | Lupke et al. |
| 6,497,956 B1 | | 12/2002 | Phillips et al. |
| 6,688,339 B2 | | 2/2004 | Yamaguchi et al. |
| RE38,508 E | | 4/2004 | Wright |
| 6,889,715 B2 | | 5/2005 | Fraser et al. |
| 6,899,140 B2 | | 5/2005 | Fraser et al. |
| 6,926,853 B2 | | 8/2005 | Hinc et al. |
| 6,955,780 B2 | | 10/2005 | Herrington |
| 7,093,638 B2 | | 8/2006 | Bonaventura |
| 7,156,128 B1 | | 1/2007 | Kanao |
| 7,200,973 B2 | | 4/2007 | Tunis |
| 7,204,286 B2 | | 4/2007 | Kasai et al. |
| 7,297,740 B2 | | 11/2007 | Dyksterhouse |
| 7,484,535 B2 | | 2/2009 | Goddard et al. |
| 7,842,149 B2 | | 11/2010 | Glejbøl et al. |
| 7,946,312 B2 | | 5/2011 | Sheldrake |
| 7,987,885 B2 | | 8/2011 | Zhou et al. |
| 8,025,834 B2 | | 9/2011 | Miller et al. |
| 8,118,064 B2 | | 2/2012 | Nakajima et al. |
| 8,152,949 B2 | | 4/2012 | Bailey et al. |
| 8,172,484 B2 | | 5/2012 | Tsukamoto |
| 8,505,587 B2 | | 8/2013 | Glejbol et al. |
| 8,678,042 B2 | | 3/2014 | Quigley et al. |
| 8,685,537 B2 | | 4/2014 | Imai et al. |
| 8,697,806 B2 | | 4/2014 | Michie, Jr. et al. |
| 8,733,405 B2 | * | 5/2014 | Goddard ................... F16L 9/00 138/121 |
| 8,747,098 B1 | | 6/2014 | Johnson et al. |
| 8,758,539 B2 | | 6/2014 | Venero et al. |
| 8,763,647 B2 | | 7/2014 | Quigley et al. |
| 8,820,800 B2 | | 9/2014 | Sutton et al. |
| 8,820,801 B2 | | 9/2014 | Sutton et al. |
| 9,759,354 B2 | * | 9/2017 | VanHoose ............... F16L 9/127 |
| 2003/0178082 A1 | | 9/2003 | Yamaguchi et al. |
| 2004/0007279 A1 | | 1/2004 | Yamaguchi et al. |
| 2004/0099324 A1 | | 5/2004 | Fraser |
| 2005/0139280 A1 | * | 6/2005 | Masui ..................... F16L 9/147 138/121 |
| 2006/0201567 A1 | * | 9/2006 | Goddard ............. B29C 47/0023 138/110 |
| 2007/0062595 A1 | | 3/2007 | Bhatnagar et al. |
| 2008/0210327 A1 | | 9/2008 | Goddard et al. |
| 2009/0114304 A1 | | 5/2009 | Mohri et al. |
| 2010/0032046 A1 | * | 2/2010 | Lupke ..................... B29C 57/00 138/121 |
| 2010/0224306 A1 | | 9/2010 | Sutton et al. |

* cited by examiner

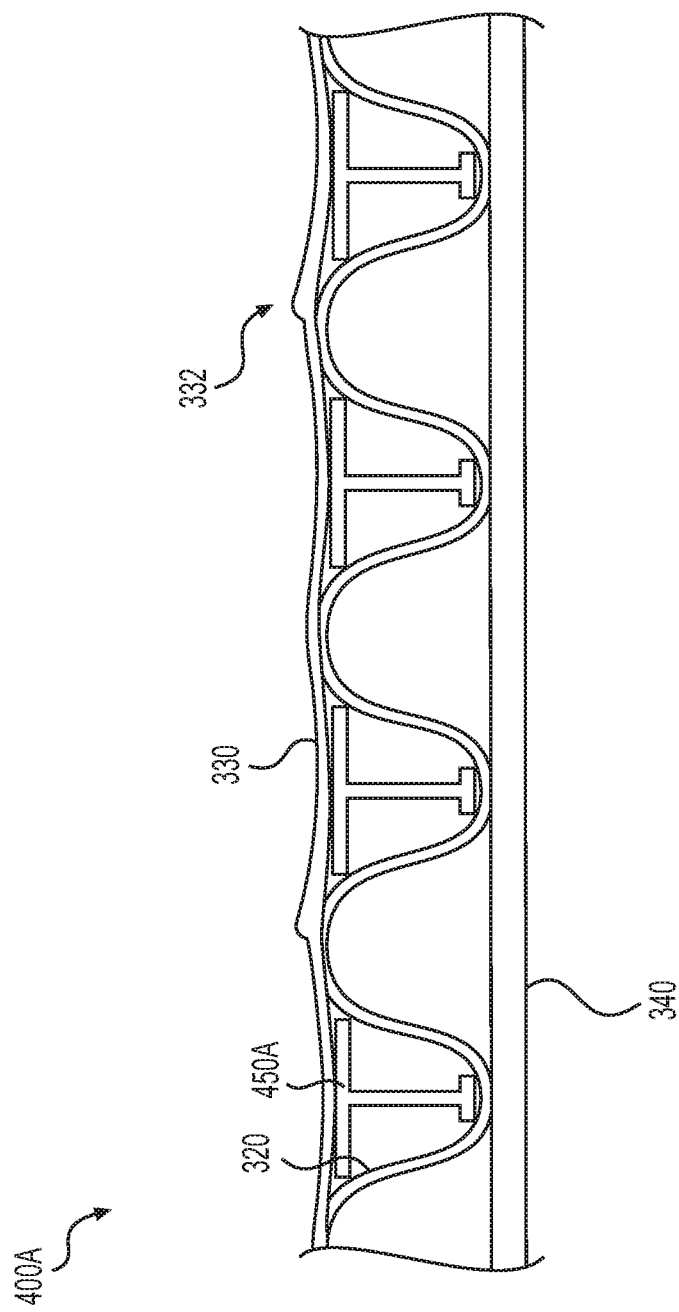

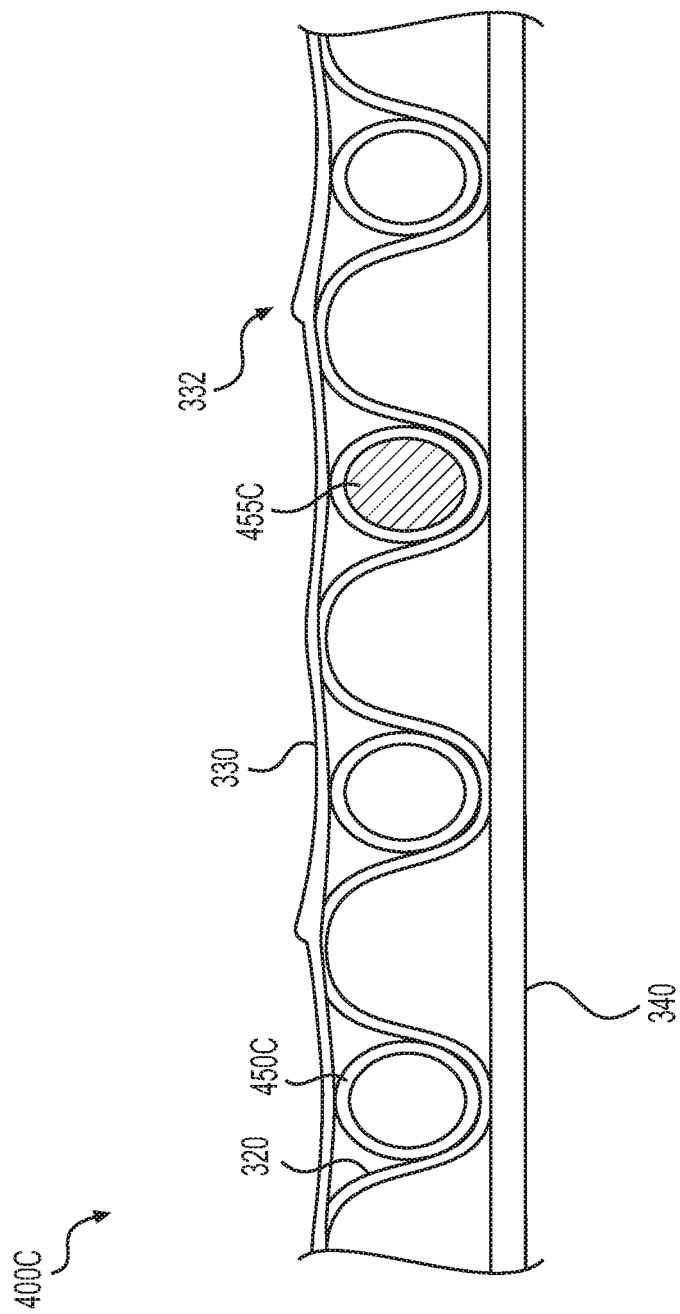

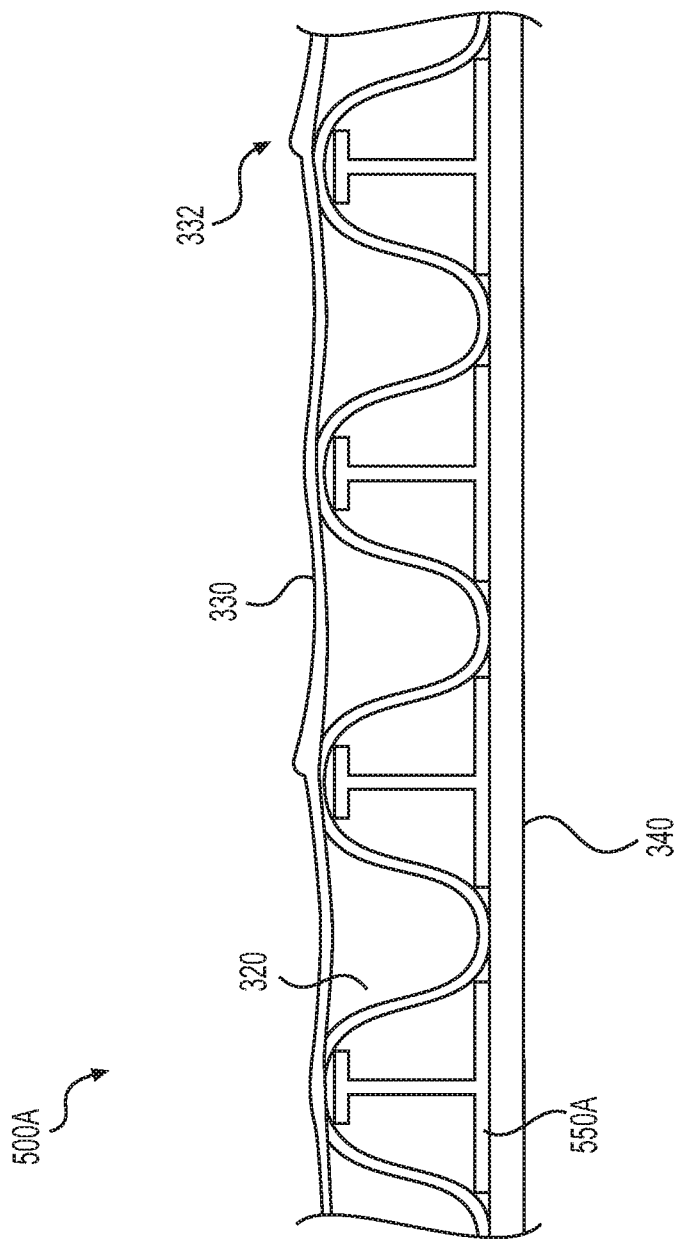

PIPE WITH AN OUTER WRAP

CROSS-REFERENCE TO RELATED PATENT APPLICATIONS

This application is a continuation-in-part of U.S. patent application Ser. No. 14/732,146, filed on Jun. 5, 2015, which is incorporated herein by reference in its entirety.

TECHNICAL FIELD

This disclosure relates generally to pipes, and more particularly to pipes with at least one reinforcing stiffener within a portion of an outer wall, including systems and methods for making the same.

BACKGROUND

Corrugated pipe is commonly used for drainage of soil and transportation of surface water. The corrugations typically create a pipe profile with steep sides and deep valleys. Given that these pipes are typically constructed using plastic, the corrugations may provide necessary structural integrity for the pipe by providing needed radial stiffness.

However, the valleys of the corrugated pipe may also require inconvenient construction accommodations. For example, corrugated pipe may require additional work to backfill. Filling material may not readily conform to the corrugated exterior, requiring additional work to fill the valleys of the exterior wall. Triple wall corrugated pipe may include an outer layer of plastic, which may produce a less capricious outer surface. However, triple wall pipe suffers from increased cost, weight, and thickness. For example, the outer layer of a triple wall pipe may require additional material, adding significant production material costs and resulting in a heavier pipe.

The walls of the corrugated pipe may additionally be susceptible to movement or deformation due to forces exerted upon the interior or the exterior surfaces of the pipe. For example, forces exerted upon the exterior surface of the pipe during manufacturing, transportation, and installation of the pipe may exert damaging forces upon the outer layer of the pipe. Further, fluid pressure exerted upon the inner surface of the pipe may damage or deform the inner wall.

It is thus apparent that the need exists for a corrugated pipe having an outer wall or layer that may be lighter in weight, stronger, cheaper to produce, more efficient to construct, and exhibit a narrower width and a lower profile. Further, the need exists for a corrugated pipe having a reinforcing structure within the corrugated wall for reinforcing the triple wall pipe against forces from inside and outside the pipe.

SUMMARY

In one embodiment, a pipe may include an axially extended bore defined by a corrugated outer wall having axially adjacent, outwardly-extending corrugation crests connected by corrugation valleys. The pipe may also include an outer wrap applied to the outer wall. The outer wrap may span the corrugation crests producing a smooth outer surface. The pipe may also include a stiffener positioned within the corrugation valleys. The stiffener may reinforce a trough of each corrugation valley.

In one embodiment, a method of reinforcing a pipe is disclosed. The method may include receiving a corrugated pipe having axially adjacent, outwardly-extending corrugation crests connected by corrugation valleys. The method may also include positioning a stiffener within the corrugation valleys. The method may further include applying an outer wrap to span the corrugation crests and to cover the stiffener.

In one embodiment, a pipe may include an axially extended bore defined by a corrugated outer wall having axially adjacent, outwardly-extending corrugation crests connected by corrugation valleys. The pipe may also include an inner liner spanning the corrugation valleys. The pipe may also include a stiffener positioned within the corrugation crests. The stiffener may reinforce a peak of each corrugation crest.

In one embodiment, a method of reinforcing a pipe is disclosed. The method may include receiving a corrugated pipe having axially adjacent, outwardly-extending corrugation crests connected by corrugation valleys. The method may also include positioning a stiffener within the corrugation crests. The method may further include applying an inner liner to span the corrugation valleys and to cover the stiffener.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A-4F illustrate a cross-sectional view of an exemplary corrugated pipe having a stiffener positioned in corrugation valleys according to some embodiments of the present disclosure.

FIGS. 5A-5D illustrate a cross-sectional view of an exemplary corrugated pipe having a stiffener positioned in corrugation crests according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

While standard corrugated pipe often suffers from increased jobsite backfill work, the pipe could be covered by a material to produce a smooth, but strong, exterior wall. For example, wrapping standard corrugated pipe in a material may result in an exterior wall without valleys which may eliminate gaps in the soil when placed in the ground at a jobsite, solving backfill problems. The outer wrap of the present invention may solve the backfill problems associated with dual wall corrugated pipe while not adding significant thickness to the pipe wall. The outer wrap material may also increase the strength of the pipe.

An outer wrap may also allow additional pipe configurations because the wrap may consist of different materials than the pipe. For example, selected wrap material may allow manufacturers to reduce costs, while increasing strength, even though the particular wrap material may result in a heavier pipe. Other wrap materials may increase the strength to weight ratio of the pipe. Additional properties of alternative wrap materials may allow manufacturers to more effectively design wrapped pipe solutions to meet design constraints.

Illustrative embodiments of the present disclosure are listed below. In one embodiment, an exemplary corrugated pipe with an outer wrap is disclosed. In another embodiment, an exemplary process for making corrugated pipe with an outer wrap is disclosed. The products and processes disclosed may be used in combination or separately. For example, the disclosed process may be used to make additional products. Further, disclosed products may be manufactured using additional processes.

Figure 1:
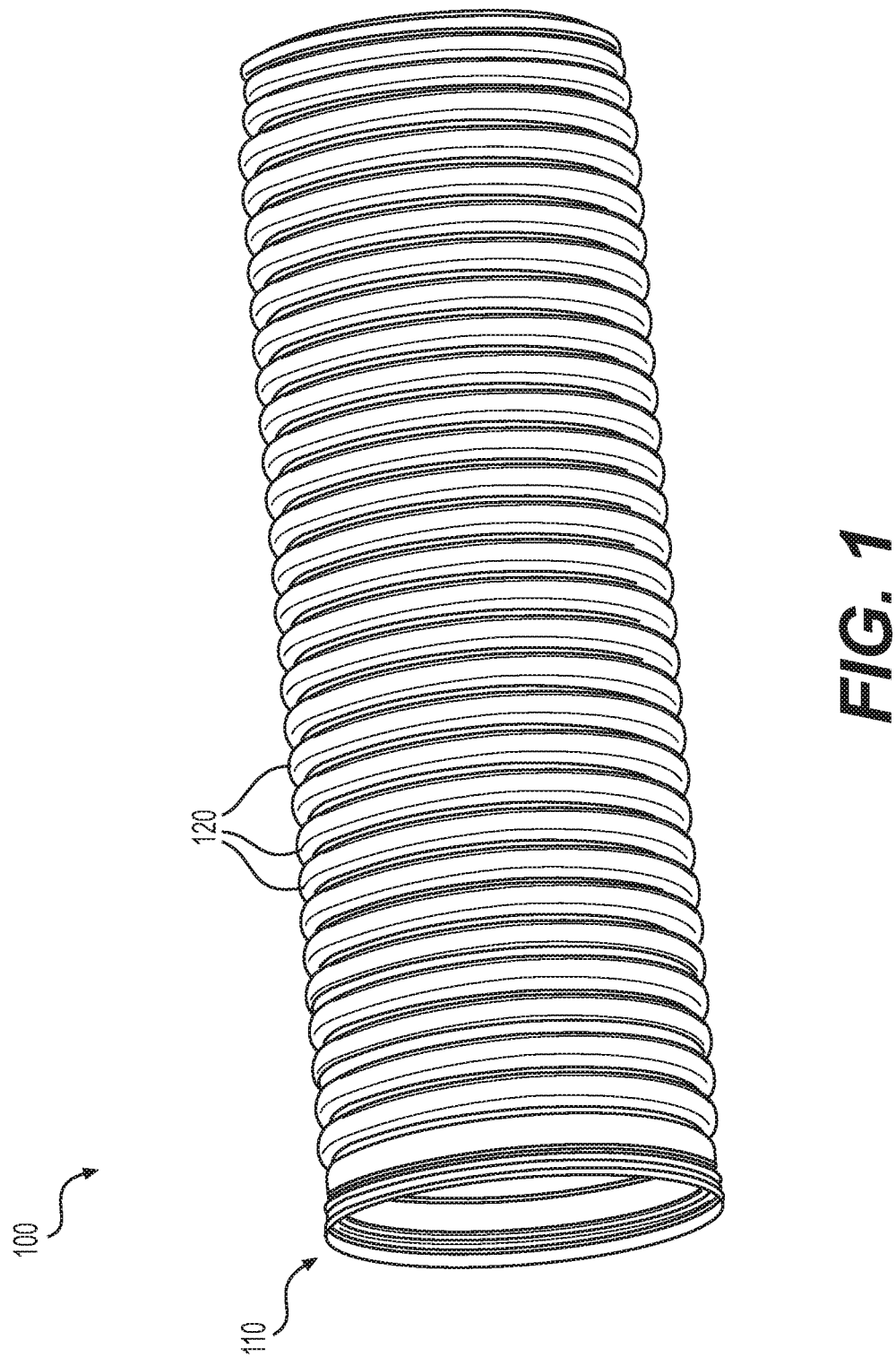
FIG. 1 illustrates an exemplary corrugated pipe according to some embodiments of the present disclosure.

FIG. 1 illustrates an exemplary corrugated pipe according to some embodiments of the present disclosure. Corrugated pipe 100 may be conventional single wall pipe or dual wall pipe that is well known in the art. Additional types of pipe may serve as corrugated pipe 100 consistent with this disclosure.

Corrugated pipe 100 may include a corrugated outer wall. For example, corrugated pipe 100 may include a series of corrugations 120. Corrugations 120 may run the length of corrugated pipe 100. In an embodiment, corrugations 120 may form spiral corrugations or annular corrugations. For example, corrugations 120 could spiral in the longitudinal around the circumference of the pipe. Corrugated pipe 100 may connect to other pipes. In an embodiment, corrugated pipe 100 may include bell 110 to facilitate connections to other pipes. For example, bell 110 may surround and contain a spigot end of another pipe. The spigot may have a smaller outer diameter than the bell, so that the spigot may fit into bell 110. Other connection types may be used with corrugated pipe 100. For example, a coupler may be used to connect to other pipes.

In an embodiment, corrugated pipe 100 may have an inner wall. For example, corrugated pipe may be a dual wall pipe. A smooth inner wall surface may be necessary or desirable for certain applications. Accordingly, a dual wall pipe, which includes a smooth inner wall may be used to satisfy design constraints. For example, a smooth inner wall may be necessary to meet pipe strength requirements or to satisfy flow path specifications. When specifications require a consistent pipe inner diameter, plans may rely on dual wall pipe having an inner wall. In other embodiments, corrugated pipe may be a single wall pipe.

Corrugated pipe 100 may be made of plastic. In an embodiment, the material of corrugated pipe 100 may include plastic or thermoplastic polymers. For example, corrugated pipe may be made of high density polyethylene (HDPE) or polypropylene (PP). Corrugated pipe 100 may alternatively comprise a variety of other materials including, for example, other plastics, metals, or composite materials.

While FIG. 1 describes corrugated pipe 100, other pipe types may be used consistent with this disclosure. In an embodiment, ribbed pipe may be wrapped. In other embodiments, pipes having any profile may be wrapped.

Figure 2:
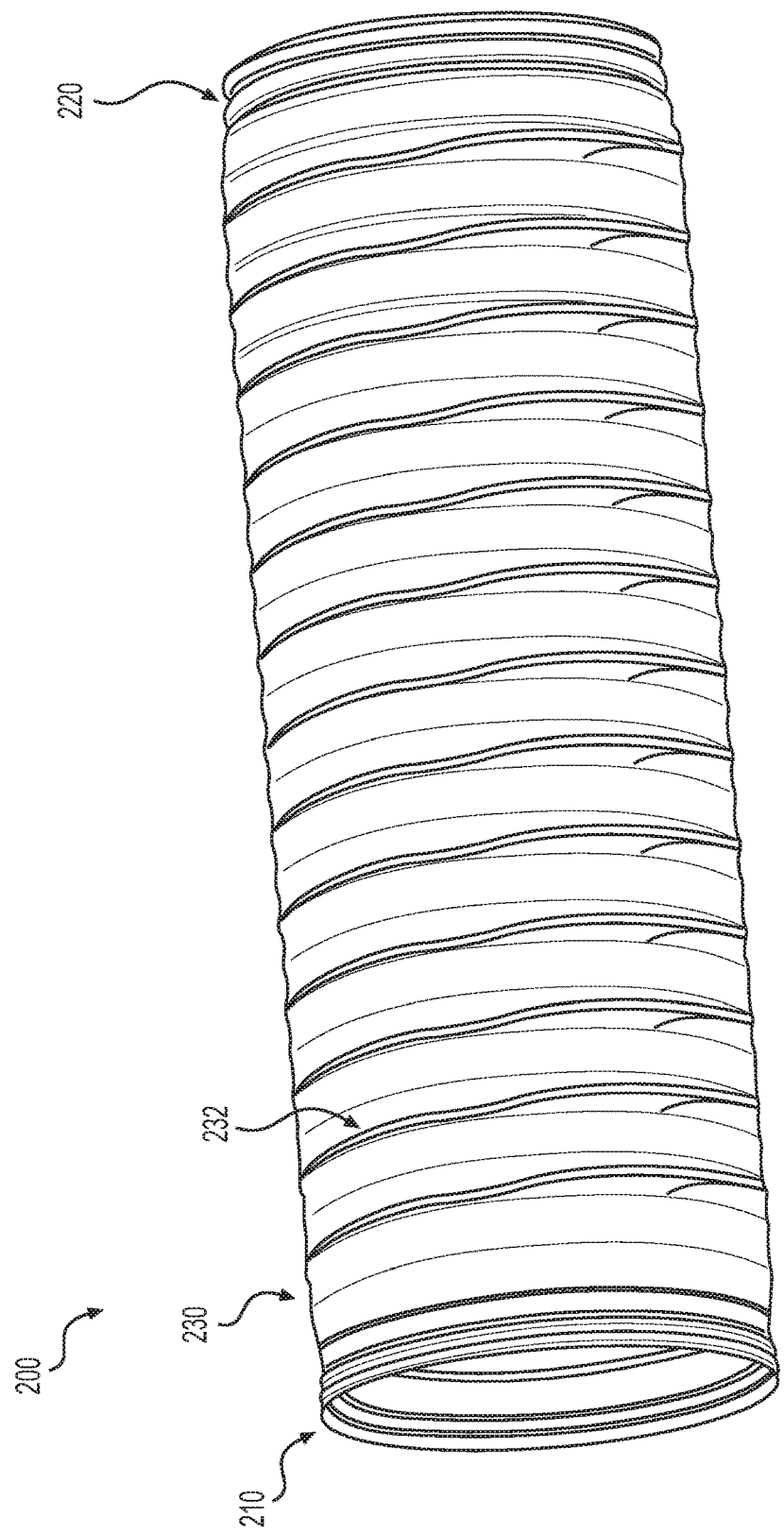
FIG. 2 illustrates an exemplary corrugated pipe having an outer wrap according to some embodiments of the present disclosure.

FIG. 2 illustrates an exemplary corrugated pipe having an outer wrap according to some embodiments of the present disclosure. Wrapped pipe 200 may include integrated bell 210, similar to corrugated pipe 100. While not depicted, various bell designs may be used, such as a proud bell, for example. A proud bell may have an outer diameter that is larger than the outer diameter of the corrugated pipe body. Proud bells have an advantage over integrated bells in that they may be joined to a pipe end having a cross section matching that of the corrugated pipe body, rather than a specific spigot end. Therefore, the proud bell may connect to pipe cut to any length. However, integrated bells may be preferable to proud bells in underground applications, because integrated bells lie on grade in a trench. Conversely, proud bells may require the digging of "bell holes" to excavate additional space in the trench to accommodate the larger outer diameter of the proud bell. As illustrated, wrapped pipe 200 may include spigot 220 to connect to bells of other pipes.

Wrapped pipe may use, for example, corrugated pipe 100 with outer wrap 230 applied. In an embodiment of the present disclosure, outer wrap 230 may form a spiral pattern. For example, outer wrap 230 may be applied as a helix (e.g., helical wrap 232) around corrugated pipe 100. In alternative embodiments, outer wrap 230 may include a single continuous layer, such as a sleeve. For example, wrap 230 may include a continuous cylindrical sleeve which may be configured to extend between the two ends of pipe 100 when applied thereto. The inside diameter of the sleeve may be substantially equal to the outer diameter of pipe 100.

Outer wrap 230 may be formed using fibers and plastic. In an embodiment, fibers (e.g., fiberglass or carbon fibers) may be embedded in plastic. Polymers such as high density polyethylene (HDPE), polypropylene (PP), or polyvinyl chloride (PVC) may be used as the plastic. Other fibers or plastics may be used consistent with this disclosure.

In an embodiment, wrapped pipe may have a pipe and wrap of different materials. For example, a pipe may be made of HDPE and a wrap may be made of fiber reinforced HDPE. This combination of materials may result in an increased strength to weight ratio because the product may be manufactured such that higher quality materials may be located more efficiently within the product.

In another example wrapped pipe, the corrugations may be made of a cheaper material. Higher quality materials may be used for the outer wrap and/or the liner. Higher quality materials may have a higher elastic and flexural modulus, better resistance to stress cracking, impact performance, and abrasion resistance, for example. When corrugations are made from a different material than the liner and/or the outer wrap, the corrugations may be manufactured using a material with additives that reduce cost at the relative expense of structural integrity.

In another embodiment, outer wrap 230 may use continuous strand fiber. The fibers may run from a reel, embedding unbroken strands in a helix and/or a cylindrical sleeve that wraps the pipe. For example, spools of fiberglass thread may provide uninterrupted strands of fiberglass for embedding in plastic around a pipe. Continuous strand fiber may result in wrapped pipe with greater resilience than other wrap types.

In an embodiment, outer wrap 230 may use non-continuous fiber. Pelletized or short segments of fiber may be embedded in plastic. For example, short fiber strands of 0.15 to 1 inch in length may be used. In certain embodiments, short fiber strands of 0.15 to 0.50 inch may be used. By configuring the feed of the molten plastic as the fiber strands are embedded in plastic, the fiber strands may align semi-oriented to the flow path as they are embedded in plastic. For example, the fibers may be oriented linear to the flow path (e.g., circumferentially to the pipe) with minor deviations in the fiber orientation. In an embodiment, semi-oriented may mean that more fibers would align parallel to the flow path than perpendicular to the flow path. For example, semi-oriented fiber may lay, on average, at an angle less than 45 degrees from the direction of the flow path.

In an embodiment, the molten plastic may be pulled at a rate higher than the extruder flow rate to further orient the fiber stands in the direction of the flow. The fiber orientation may vary based on the type of fiber used, the length of the fibers, the diameter of the pipe to be wrapped, the type of plastic that the fibers are to be embedded in, and the thickness of the outer wrap.

In an embodiment, outer wrap 230 may use fiberglass impregnation. Pelletized or short segments of fiber may be embedded in plastic with no deliberate orientation, which may result in an isotropic material, which may have uniform structural integrity in all directions. By reducing the flow rate of the material through the die and/or reducing pulling (e.g., stretching) of the material as it exits the die, manufacturers may reduce the orientation of fiber strands in the outer wrap.

In another embodiment, outer wrap 230 may not use fibers. Plastic may be applied to corrugated pipe 100 by itself. For example, HDPE may be wrapped onto a pipe in a helix and/or cylindrical sleeve to create a smooth outer layer. The temperature and flow rate of the plastic may be dependent upon the thickness of the wrap, the diameter of the pipe, and the type of material used in the plastic wrap without fiber. Example flow rates may range from 10 to 30 feet per minute.

Outer wrap 230 may run the length of the pipe. When coupling mechanisms at the ends of the pipe require specific materials, outer wrap 230 may span the length of the corrugations, ending just before coupling mechanisms, such as bell 210 or spigot 220, for example. Further, pipes may be wrapped in portions or segments as a particular application may require.

In an embodiment, wrap 230 may wrap bell 210 completely and end at spigot 220. For example, bell 210 may be completely covered. In another embodiment, both bell 210 and spigot 220 may not be wrapped. When a continuous wrap process is used, a mechanism may be used to remove the wrap from spigot 220 and/or bell 210 as desired, regardless of the bell type.

Figure 3:
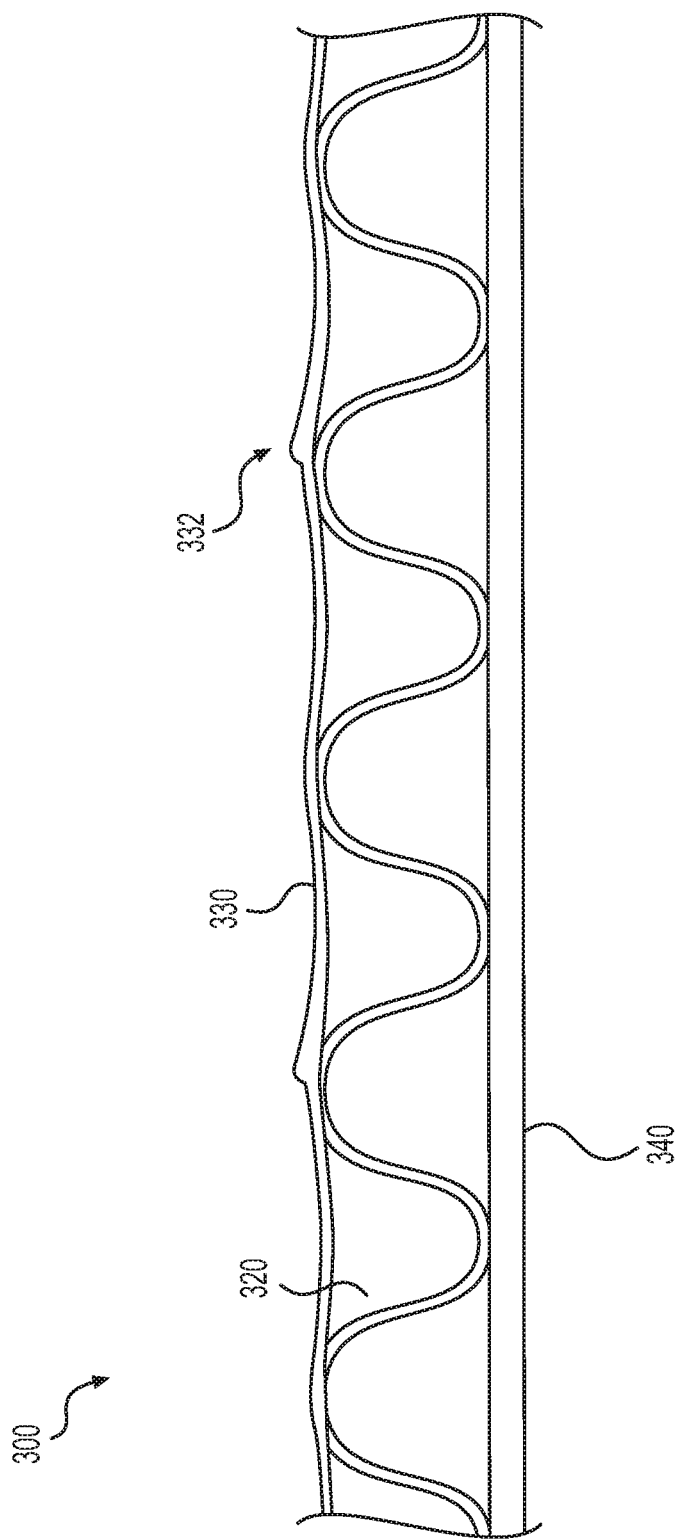
FIG. 3 illustrates a cross-sectional view of an exemplary corrugated pipe having an outer wrap according to some embodiments of the present disclosure.

FIG. 3 illustrates a cross-sectional view of an exemplary corrugated pipe having an outer wrap according to some embodiments of the present disclosure. Pipe profile 300 may include liner 340 and corrugation layer 320. These two layers may form a dual wall pipe. In some embodiments, liner 340 may not be used, and corrugation layer 320 may form a single wall pipe that is wrapped. The outer wrap may form third wall 330. For example, third wall 330 may be a layer of fibers embedded in plastic.

In an embodiment, the wrap may be applied in a helix, producing third wall edge 332 that may be generated from the overlap of the helix. For example, the corrugated pipe may be rotated as the wrap is applied down the length of the pipe. This process may apply the outer wrap as a spiral. To ensure adequate coverage by the wrap, each spiral may slightly overlap, producing third wall edge 332.

In alternative embodiments, the wrap may be applied as a continuous cylindrical sleeve. Third wall edge 332 may not be formed in such embodiments because the wrap is not wound helically around the pipe. The wrap may include a single sheet of material which may be sized to extend over the entire longitudinal length of the pipe when applied thereto. For example, the wrap may be applied to the pipe, and may have two opposed side edges which may overlap slightly to ensure adequate coverage by the wrap.

In an embodiment, the wrap material may bond with the pipe material. For example, the outer wrap and corrugation materials may be welded together by heating the materials to their thermoplastic state and pressing them together. Some materials used for the outer wrap and the corrugations may allow the use of solvent cements or epoxies to bond the wrap to the corrugations.

In an embodiment, the wrap material may be secured to the pipe by the tension of the wrap. Certain wrap and corrugation materials may not bond well together. For example, when dissimilar materials are used, such as an outer wrap made of PP and a corrugated pipe made of HDPE, a friction fit may secure the wrap to the corrugated pipe. The frictional forces may be strong enough such that the materials may appear to be attached. However, the wrap may separate from the pipe with less force than when the wrap is welded to the pipe.

In some embodiments, an outer wrap may be applied using a manufacturing process in accordance with some embodiments of the present disclosure. The steps discussed below and their order are merely exemplary. Steps may be performed in other orders. Further, certain steps may be omitted or duplicated consistent with this disclosure.

In an embodiment, a pipe may be formed in a corrugator. For example, a dual wall pipe may be formed. An exemplary pipe having an inner liner layer with a second corrugated layer is produced using known processes. In an embodiment, a single wall pipe with only a corrugated layer may be produced. In an embodiment, pipe may be formed using a mandrel, such as ribbed pipe. Other embodiments may utilize pipe having any profile.

After the pipe is formed, the pipe may be cut to length. For example, the corrugated pipe may be cut to its final length or a usable length so that the pipe may be transferred to the outer wrap die.

In an embodiment, instead of the pipe being cut to length, the outer wrap may be applied in-line. For example, the uncut corrugated pipe may continue directly to the outer wrap die assembly. The die assembly may apply the outer wrap in the pipe production line. The die may rotate around the stationary pipe after it exits the corrugator to apply the outer wrap.

Control equipment may determine a wrap type. In an embodiment, a computer controller may control the flow and application of the outer wrap extrusion die. For example, the die may apply oriented continuous strand fiber, semi-oriented non-continuous fiber, fiberglass impregnation, or no fiber with the plastic. The die may allow the wrap type to be changed.

The die assembly may wrap the pipe. In an embodiment, a corrugated pipe may be placed adjacent to a filament die. The pipe may be rotated as it moves past the openings of the filament die. The rotation and traversal of the pipe in relation to the die assembly may be controlled so that the ribbon extruded from the die assembly forms a continuous outer layer.

In an embodiment, the pressure, temperature, and type of materials used in the extrusion process may be altered based on the wrap type. For example, the temperature or flow rate may alter the wrap. For example, for HDPE temperatures ranging from 350 to 450 degrees Fahrenheit may be used to heat the wrap material for extrusion. The die may extrude plastic at a width ranging from 4 to 40 inches. In some embodiments, the minimum extrusion width may be substantially equal to twice the corrugation pitch. In some embodiments, the maximum extrusion width may reflect one or more manufacturing parameters, such as plant floor space, power capacity, material handling capacity, and/or extruder throughput. When the wrap is applied as a helix, the pitch of the helix may be determined based on the outer circumference of the pipe and the width of the extruded plastic. The die may also switch from continuous to non-continuous fiber. The switching process may be substantially automated by use of mechanical automation tools to change the sources of materials or die settings.

Control equipment may also determine the thickness of the wrap layer. The control equipment may facilitate a particular flow rate of wrap material (e.g., the flow rate(s) plastic and/or fiber). Control equipment may also provide a particular wrap thickness by controlling the feed rate pulling the extruded material. For example, manufacturing equipment may pull extruded outer wrap (e.g., plastic or plastic with fibers) twice as fast as the material is extruded. When the ratio of the pull rate to the extrusion flow rate is greater than 1:1, the outer wrap material may stretch as it is applied to the pipe. Various pull to feed ratios may be used to control the thickness of the outer wrap. Moreover, a higher pull to feed ratio (e.g., increased pulling of the outer wrap) may result in increased alignment of the fiber strands, when they are embedded in the plastic of the wrap. When using continuous strand fiber, pulling the outer wrap material may have greater limitations. For example, lower pull to feed ratios may need to be used. In an example wrapped pipe, a corrugated HDPE pipe may be wrapped by heating fiber reinforced HDPE to a temperature of 350 to 450 degrees Fahrenheit for extruding at a rate of 20 feet per minute (e.g., plus or minus 5 feet per minute). The wrap material may be pulled at a ratio of 5:4, for example, relative to the extrusion rate. When the pipe may have an inconsistent outer diameter, such as pipes with proud bells, for example, the rotational velocity of the pipe may vary to provide a consistent linear velocity at the outer diameter.

After wrapping is complete, the wrapped pipe may be held for cooling. Additional post-wrap processes may include removal of any wrap material over the spigot and/or the bell. For example, the exterior surface of the spigot may need to remain unwrapped to properly connect with other pipes. In order to remove the wrapping, should the wrapping process cover the spigot, a mechanism may cut the wrap covering the spigot and remove the wrap, exposing the exterior surface of the spigot. In some embodiments, the wrap process may not wrap the spigot, which may eliminate the need for a removal step.

FIGS. 4A-4F illustrate cross-sectional views of an exemplary corrugated pipe having a stiffener positioned in corrugation valleys according to some embodiments of the present disclosure. Pipe profiles 400A-400F may include liner 340 and corrugation layer 320. These two layers may form a dual wall pipe. In some embodiments, liner 340 may not be used, and corrugation layer 320 may form a single wall pipe that is wrapped. The outer wrap may form third wall 330. For example, third wall 330 may be a layer of fibers embedded in plastic.

Corrugation layer 320 may form axially adjacent, outwardly-extending corrugation crests. The corrugation crests may be separated by inwardly-extending corrugation valleys. Each corrugation crest may have a peak upon which the outer wrap may be applied and which third wall 330 may span. Accordingly, the interior space of each corrugation crest may be exposed to liner 340. Each corrugation valley may have a trough that contacts liner 340. Accordingly, the interior space of each corrugation valley may be exposed to third wall 330.

Pipe profiles 400A-400F may additionally include stiffener 450A-450F positioned within some or all of the corrugation valleys of corrugation layer 320. Stiffener 450A-450F may exert stiffening force upon one or more of corrugated wall 320, third wall 330, and liner 340, thus providing greater pipe stiffness. Advantageously, stiffener 450A-450F may reduce deflection of corrugated wall 320, third wall 330, and/or liner 340 under internal or external loads. For example, stiffener 450A-450F may contact the trough of each corrugation valley and exert stiffening force upon it. This improved stiffness may prevent deflection and deformation of liner 340 due to forces exerted upon it by, for example, fluids within the pipe. Alternatively or additionally, stiffener 450A-450F may contact and exert stiffening force upon third wall 330. As a result, third wall 330 may be reinforced against external forces exerted upon it during, for example, manufacturing, transportation, and/or installation of the pipe. In some embodiments, stiffener 450A-450F may increase or maximize the moment of inertia of corrugated wall 320, third wall 330, and/or liner 340, thus enhancing the stiffness thereof and reducing deflection thereof under internal or external loads. The enhanced stiffness may be provided, at least in part, by the high modulus of elasticity of stiffener 450A-450F.

Alternatively or additionally, stiffener 450A-450F may provide an additional support during application of outer wall 330. For example, stiffener 450A-450F may be placed within some or all of the corrugation valleys, after which outer wall 330 may be applied. The outer surface of stiffener 450A-450F may provide a forming surface of outer wall 330 while the inner surface of stiffener 450A-450F may provide support during application of outer wall 330, such that a smoother and/or flatter outer wall 330 may be formed. For example, stiffener 450A-450F may reduce the protrusion of outer wall 330 into the corrugation valleys. Advantageously, the smoother outer wall 330 may improve the ease of backfilling.

FIG. 4A illustrates an exemplary stiffener 450A according to some embodiments. Stiffener 450A may have an I-shaped cross-section with an outer portion in contact with third wall 330, an inner portion in contact with the trough of the corrugation valley, and a middle portion extending between the outer and inner portions. The middle portion may be narrower than the outer and inner portions. In some embodiments, the outer and inner portions may have the same width. In some alternative embodiments, the outer portion may be wider than the inner portion.

In some embodiments, the inner portion may be narrowly configured to contact the inner-most point of the troughs of the corrugation valleys. In some alternative embodiments, the inner portion may be configured such that the width of the inner portion precludes the inner portion from contacting the inner-most point of the troughs and may instead contact two opposing portions of corrugated wall 320. In such an alternative embodiment, stiffener 450A may be configured to exert stiffening force upon liner 340 by transferring force from the two contacted portions of corrugated wall 320 to liner 340. In some embodiments, the two axial ends of the outer portion of stiffener 450A may contact two opposing portions of corrugated wall 320.

Figure 4B:
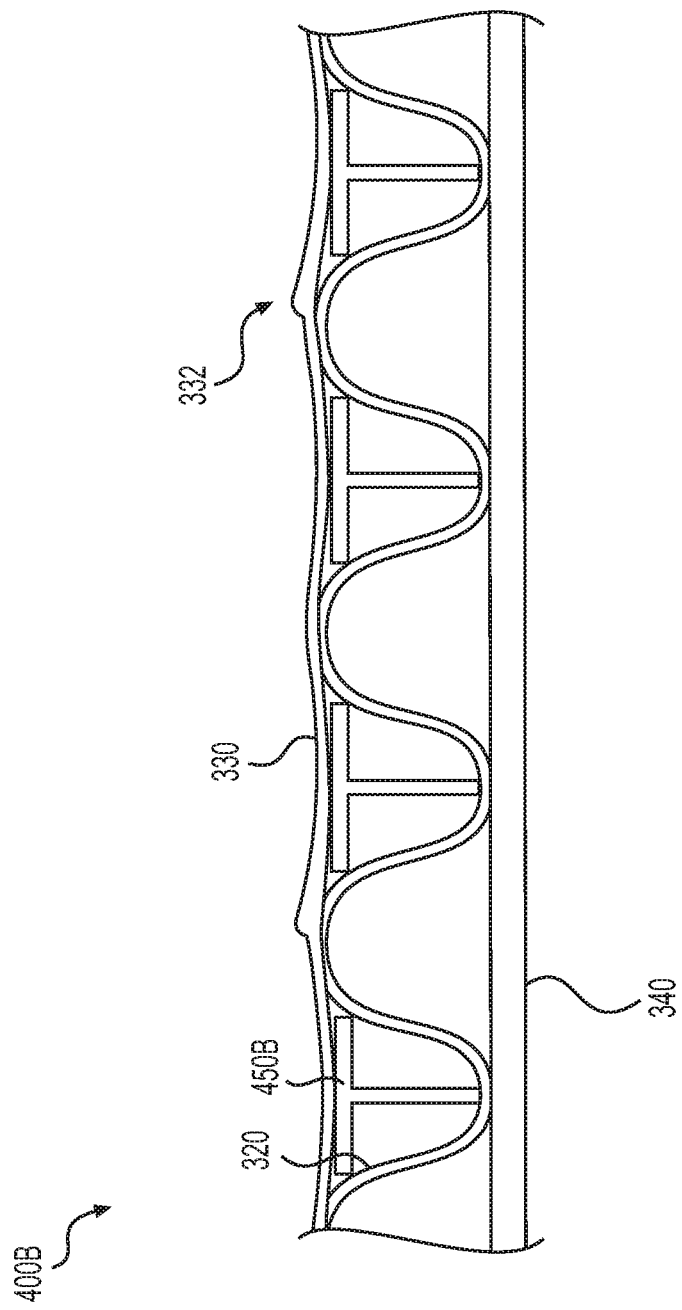

FIG. 4B illustrates an exemplary stiffener 450B according to some embodiments. Stiffener 450B may have a T-shaped cross-section, with an outer portion in contact with third wall 330 and an inner portion extending between the outer portion and the troughs of the corrugation valleys. The inner portion may be narrower than the outer portion and may be configured to sit within the inner-most point of the troughs of the corrugation valleys. In some embodiments, the two axial ends of the outer portion of stiffener 450B may contact two opposing portions of corrugated wall 320.

FIG. 4C illustrates an exemplary stiffener 450C according to some embodiments. Stiffener 450C may have a circular cross-section or an oval-shaped cross-section. An inner portion of stiffener 450C may lie substantially flush with corrugated wall 320. In some embodiments, the inner portion of stiffener 450C and the portion of corrugated wall 320 forming the corrugation valley may have the same shape, such that an extended surface of stiffener 450C may be configured to lie against corrugated wall 320. An outer portion of stiffener 450C may contact third wall 330.

In some embodiments, the circular or oval-shaped cross-section of stiffener 450C may be hollow. Additionally or alternatively, the area within the cross-section of stiffener 450C may be at least partially filled with a filling material 455C. In some embodiments, the filling material may be a non-plastic foam, such as polyurethane foam, high melt polyethylene, or aluminum foam. In some embodiments, the filling material may comprise two or more materials. The filling material may provide additional structural integrity to stiffener 450C.

In some embodiments, stiffeners 450A-450C may be secured within the corrugation valleys by corrugated wall 320 and third wall 330, which may in turn be secured together according to various embodiments explained above. In some embodiments, stiffeners 450A-450C may be retained in place by their respective cross-sectional shapes, which may abut one or more of corrugated wall 320 and third wall 330, preventing stiffener movement. Alternatively or additionally, stiffeners 450A-450C may be secured to one or more of corrugated wall 320 and third wall 330 with an adhesive.

Figure 4D:
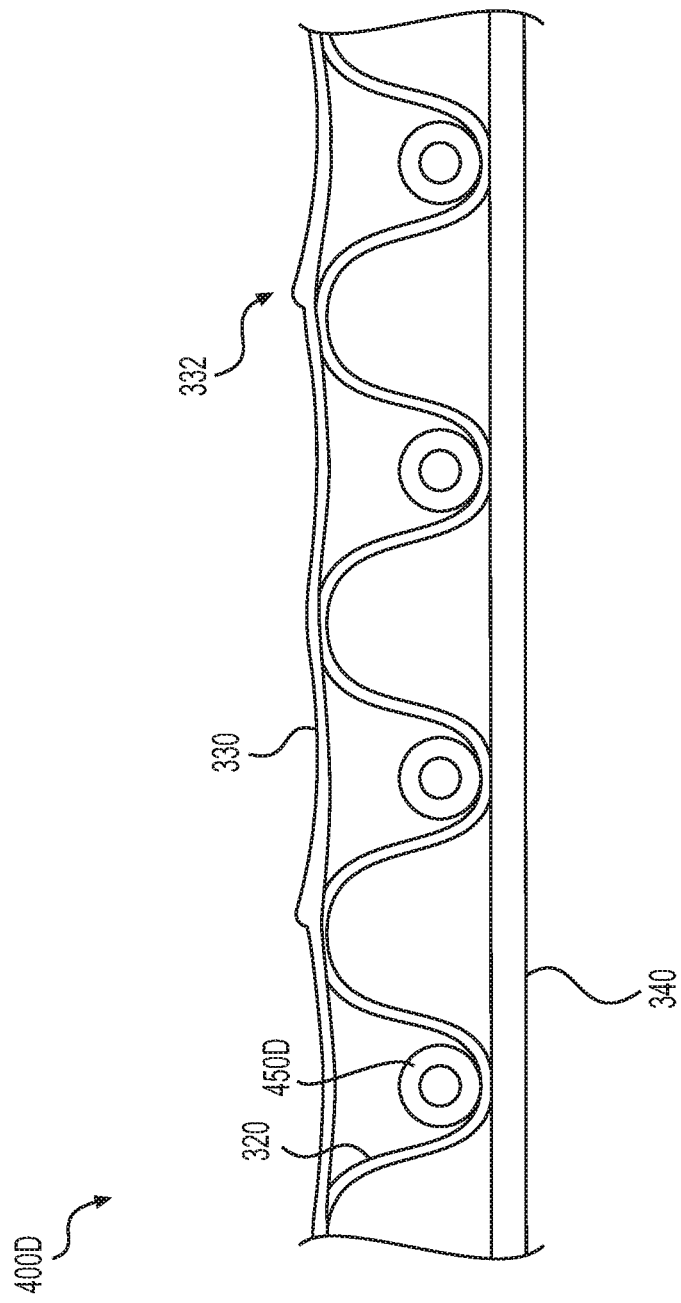

FIG. 4D illustrates an exemplary stiffener 450D according to some embodiments. Stiffener 450D may have a circular cross-section or an oval-shaped cross-section. An inner portion of stiffener 450D may be configured to sit within the inner-most point of the troughs of the corrugation valleys.

In some embodiments, the circular or oval-shaped cross-section of stiffener 450D may be hollow. In some alternative embodiments, the area within the cross-section of stiffener 450D may be filled with a filling material. In some embodiments, the filling material may be a non-plastic foam, such as polyurethane foam, high melt polyethylene, or aluminum foam. In some embodiments, the filling material may comprise two or more materials. The filling material may provide additional structural integrity to stiffener 450D. In some embodiments, stiffener 450D may be secured to corrugated wall 320 with an adhesive.

Figure 4E:
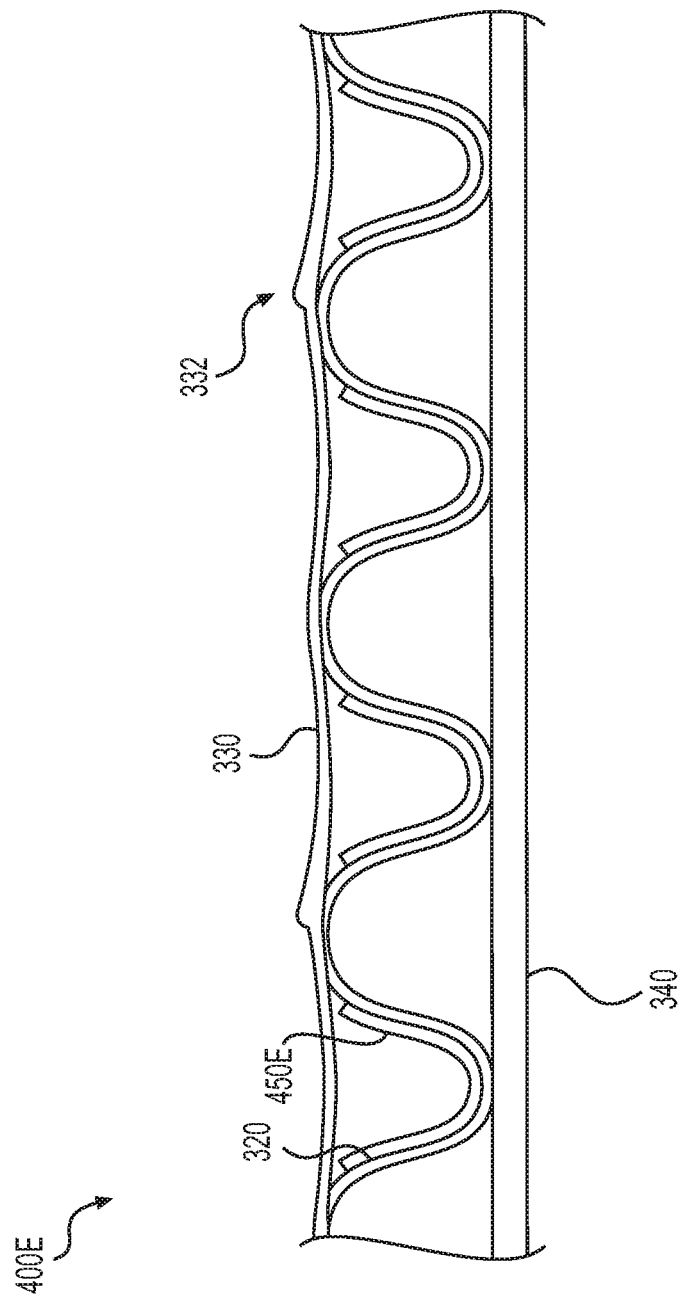

FIG. 4E illustrates an exemplary stiffener 450E according to some embodiments. Stiffener 450E may be a sheet of reinforcing material that lies flush with corrugated wall 320 within the corrugation valleys. Accordingly, stiffener 450E and corrugated wall 320 may have the same profile such that they lie flush with each other. In some embodiments, stiffener 450E may have a rectangular or square-shaped cross-section. In some embodiments, the outer ends of stiffener 450E may contact third wall 330. In some alternative embodiments, the outer ends of stiffener 450E do not contact third wall 330, and instead contact opposite portions of corrugated wall 320.

In some embodiments, stiffener 450E may be secured within the corrugation valleys by virtue of having the same shape as corrugated wall 320. That is, stiffener 450E may be secured due to flush contact being made by stiffener 450E with corrugated wall 320. Alternatively or additionally, stiffener 450E may be secured to one or more of corrugated wall 320 and third wall 330 with an adhesive.

Stiffeners 450A-450E may comprise one or more materials. In some embodiments, stiffeners 450A-450E may be constructed of a plastic material, such as PVC, and/or of a thermosetting material such as thermosetting resins. Alternatively or additionally, stiffeners 450A-450E may be constructed of one or more non-plastic materials, such as steel, fiberglass, aluminum, tin, copper, rubber, and/or wood. Exemplary materials may provide stiffeners 450A-450E with structural integrity such that stiffeners 450A-450E do not flex or deform when sustaining forces from inside or outside the pipe. Additionally, stiffeners 450A-450E may be so configured and constructed so as to not tear or puncture third wall 330 or corrugated wall 320.

In some embodiments, stiffeners 450A-450E may be positioned within the corrugation valleys of corrugated wall 320, after which time some or all of the corrugation valleys may be at least partially filled with a filling material to surround exposed portions of stiffeners 450A-450E. Alternatively, the filling material may be added to the corrugation valleys prior to stiffeners 450A-450E being positioned within the corrugation valleys. In some embodiments, the filling material may be a non-plastic foam, such as polyurethane foam, high melt polyethylene, or aluminum foam. In some embodiments, the filling material may comprise two or more materials. The filling material may render stiffeners 450A-450E and the corrugation valleys stiffer and thus better able to withstand internal and external forces. Additionally, the filling material may aid in further securing stiffeners 450A-450E within the corrugation valleys.

Figure 4F:
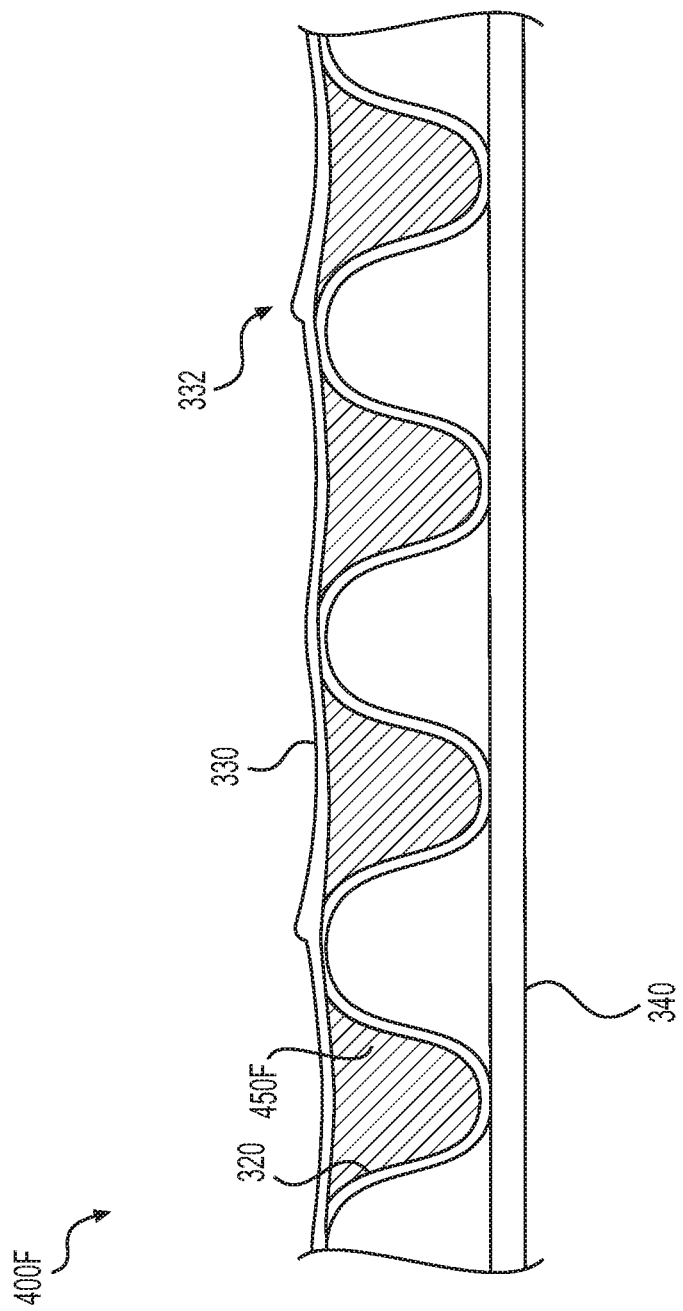

FIG. 4F illustrates an exemplary stiffener 450F according to some embodiments. Stiffener 450F may be a filling material that at least partially fills the corrugation valleys. In some embodiments, the corrugation valleys are completely filled with filling material 450F. In some embodiments, filling material 450F may be a non-plastic foam, such as polyurethane foam, high melt polyethylene, or aluminum foam. In some embodiments, filling material 450F may comprise two or more materials. Once applied and set within the corrugation valleys, filling material 450F may be sufficiently rigid so as to reinforce corrugated wall 320, third wall 330, and liner 340.

In some embodiments, corrugated wall 320 may form spiral corrugations or helical corrugations. For example, corrugated wall 320 may spiral around the circumference of the pipe along the longitudinal axis of the pipe. This may result in the corrugation crests, the corrugation valleys, and stiffeners 450A-450F also spiraling around the circumference of the pipe. In some embodiments, the pipe may include a single corrugation crest and a single corrugation valley, each of which may spiral around the circumference of the pipe along the entire longitudinal length thereof. In some alternative embodiments, the pipe may include a plurality of corrugation crests and a plurality of corrugation valleys. Stiffeners 450A-450F may be helical or spiraling structures that may be placed within the one or more spiraling corrugation valleys of the pipe. In some embodiments, a single spiraling stiffener 450A-450F may be placed within each corrugation valley. Each stiffener 450A-450F may extend along the entire longitudinal length of the pipe or along a portion of the longitudinal length of the pipe. In other embodiments, one or more spiraling stiffeners 450A-450F may be placed within each corrugation valley. The one or more stiffeners 450A-450F may extend along the same longitudinal portion of the pipe or along different longitudinal portions of the pipe. In yet other embodiments, spiraling stiffeners 450A-450F may be placed in a subset, and not all, of the corrugation valleys.

In some embodiments, corrugated wall 320 may form annular corrugations. For example, annular corrugations may extend around the circumference of the pipe. According to these embodiments, stiffeners 450A-450F may include a plurality of annular stiffeners, each of which may be placed within a single corresponding corrugation valley. In some embodiments, a single stiffener 450A-450F may be placed within each corrugation valley. In other embodiments, one or more stiffeners 450A-450F may be placed within each corrugation valley. In yet other embodiments, stiffeners 450A-450F may be placed in a subset, and not all, of the corrugation valleys.

Exemplary pipe profiles 400A-400F may be manufactured according to various embodiments explained above. In some embodiments, before the outer wrap is applied to form third wall 330, one of stiffeners 450A-450F may be positioned within some or all of the corrugation valleys. According to some embodiments in which stiffener 450A-450F is a spiraling or helical structure, positioning of stiffener 450A-450F may include threading stiffener 450A-450F along corrugation wall 320 until the stiffener 450A-450F is correctly positioned within the corrugation valleys. Alternatively, placement of at least one of stiffeners 450A-450F may include forming, deforming, or otherwise fitting the at least one stiffener 450A-450F into place within the corrugation valleys. Alternatively, the at least one stiffener 450A-450F may be placed within the corrugation valleys using other techniques.

According to some embodiments in which stiffener 450A-450F and the corrugations of corrugated wall 320 are annular, stiffener 450A-450F may be formed, deformed, or otherwise fitted into place within the corrugation valleys. In some embodiments in which stiffener 450A-450F forms an annular structure about the circumference of the pipe, the ends of stiffener 450A-450F may be joined to form a complete annular structure that may span the entire pipe circumference.

After placement of one of stiffeners 450A-450F within the corrugation valleys, the outer wrap may be applied according to various embodiments explained above. The outer wrap may be applied to contact and span the corrugation crests. According to some embodiments, the outer wrap may be applied to contact and span at least a portion of stiffener 450A-450F. The outer wrap may be applied to completely cover the corrugation valleys, thereby encasing stiffener 450A-450F within the corrugation valleys. In some embodiments, after placement of stiffener 450A-450F and before application of the outer wrap, filling material may be applied within some or all of the corrugation valleys. In some alternative embodiments, filling material may be placed within the corrugation valleys, after which the stiffener 450A-450F may be placed and the outer wrap may be applied.

FIGS. 5A-5D illustrate cross-sectional views of an exemplary corrugated pipe having a stiffener positioned in each corrugation crest according to some embodiments of the present disclosure. Pipe profiles 500A-500D may include liner 340 and corrugation layer 320. These two layers may form a dual wall pipe. In some embodiments, liner 340 may not be used, and corrugation layer 320 may form a single wall pipe that is wrapped. The outer wrap may form third wall 330. For example, third wall 330 may be a layer of fibers embedded in plastic. In some embodiments, third wall 330 may not be used. Corrugation layer 320 may form axially adjacent, outwardly-extending corrugation crests, which may be separated by inwardly-extending corrugation valleys.

Pipe profiles 500A-500D may additionally include stiffener 550A-550D positioned within some or all of the corrugation crests of corrugation layer 320. Stiffener 550A-550D may exert stiffening force upon one or more of corrugated wall 320, third wall 330, and liner 340, thus providing greater pipe stiffness. Advantageously, stiffener 550A-550D may reduce deflection of corrugated wall 320, third wall 330, and/or liner 340 under internal or external loads. For example, stiffener 550A-550D may contact the peak of each corrugation crest and exert stiffening force upon it. This improved stiffness may prevent deflection and deformation of third wall 330 due to forces exerted upon it during, for example, manufacturing, transportation, and/or installation of the pipe. Alternatively or additionally, stiffener 550A-550D may contact and exert stiffening force upon liner 340. As a result, liner 340 may be reinforced against internal forces exerted upon it by, for example, fluids within the pipe. In some embodiments, stiffener 550A-550D may increase or maximize the moment of inertia of corrugated wall 320, third wall 330, and/or liner 340, thus enhancing the stiffness thereof and reducing deflection thereof under internal or external loads. The enhanced stiffness may be provided, at least in part, by the high modulus of elasticity of stiffener 550A-550D.

Alternatively or additionally, stiffener 550A-550D may provide an additional support during application of liner 340. For example, stiffener 550A-550D may be placed within some or all of the corrugation crests, after which 550A-550D may be applied. The inner surface of stiffener 550A-550D may provide a forming surface of liner 340 while the outer surface of stiffener 550A-550D may provide support during application of liner 340, such that a smoother and/or flatter liner 340 may be formed. For example, stiffener 550A-550D may reduce the protrusion of liner 340 into the corrugation crests. Advantageously, the smoother liner 340 may improve the flow of fluids through the pipe.

FIG. 5A illustrates an exemplary stiffener 550A according to some embodiments. Stiffener 550A may have an I-shaped cross-section with an inner portion in contact with liner 340, an outer portion in contact with the peak of the corrugation crest, and a middle portion extending between the inner and outer portions. The middle portion may be narrower than the outer and inner portions. In some embodiments, the outer and inner portions may have substantially similar widths or may have identical widths. In some alternative embodiments, the inner portion may be wider than the outer portion.

In some embodiments, the outer portion may be substantially narrow enough to contact the inner-most point of the peak of the corrugation crest. In some alternative embodiments, the outer portion may be too wide to contact the inner-most point of the peak and may instead contact first and second opposing portions of corrugated wall 320. In such an event, stiffener 550A may still exert stiffening force upon third wall 330 by transfer of force from the two contacted opposing portions of corrugated wall 320 to third wall 330. In some embodiments, first and second axial ends of the inner portion of stiffener 550A may contact first and second opposing portions of corrugated wall 320, respectively.

In some embodiments, stiffener 550A may have a T-shaped cross-section, with an inner portion in contact with liner 340 and an outer portion extending between the inner portion and the peak of the corrugation crests. The outer portion may be narrower than the inner portion and may be configured to sit within the inner-most point of the peaks of the corrugation crests. In some embodiments, the two axial ends of the inner portion of stiffener 550A may contact two opposing portions of corrugated wall 320.

Figure 5B:
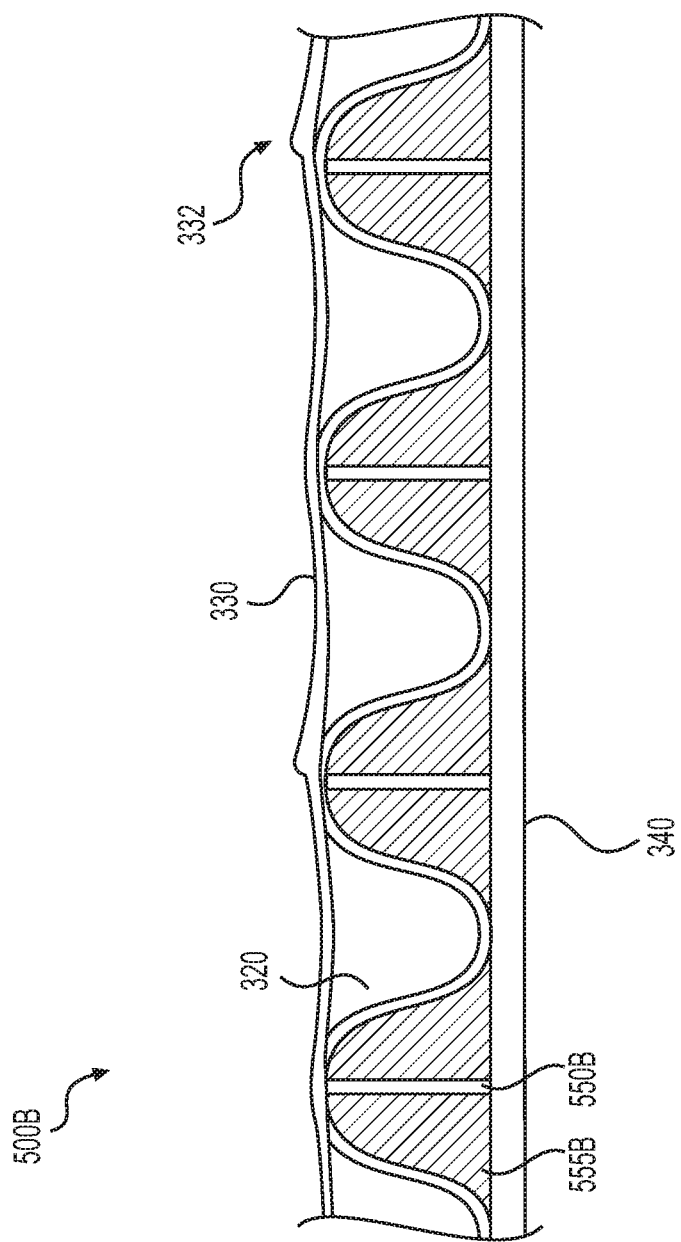

FIG. 5B illustrates an exemplary stiffener 550B according to some embodiments. Stiffener 550B may have a straight cross-section and may extend between the peaks of the corrugation crests and liner 340. In some embodiments, stiffener 550B may extend in a direction perpendicular to the plane of liner 340.

Figure 5C:
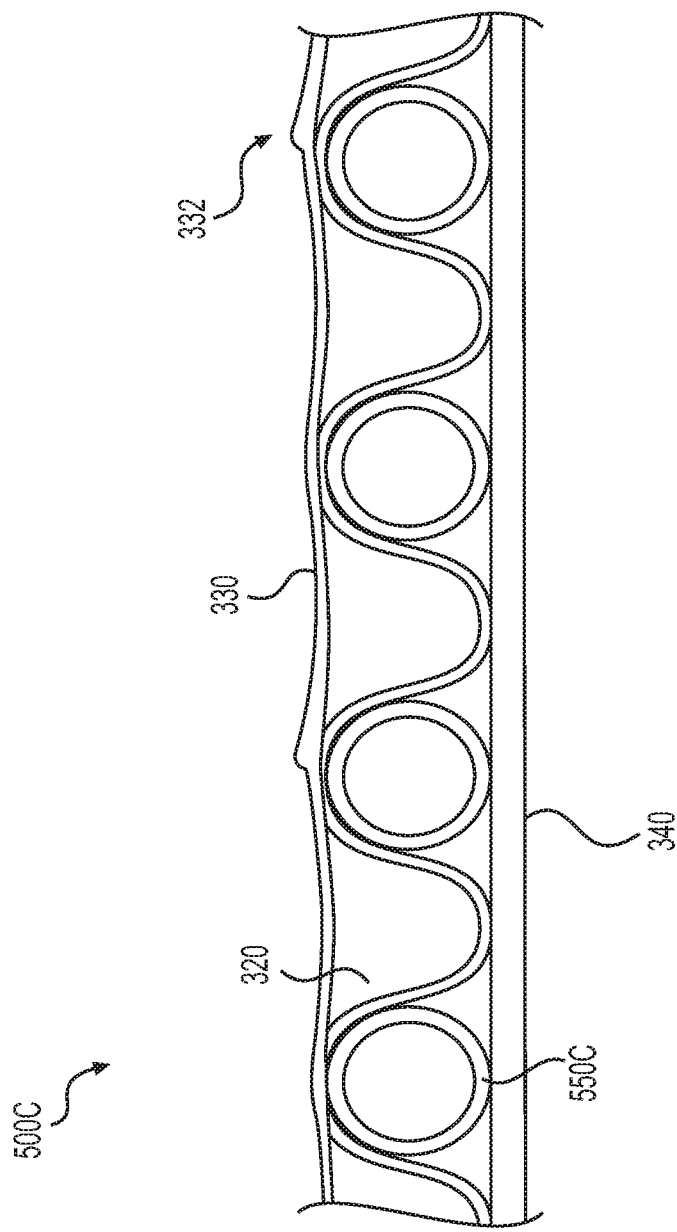

FIG. 5C illustrates an exemplary stiffener 550C according to some embodiments. Stiffener 550C may have a circular cross-section or an oval-shaped cross-section. An outer portion of stiffener 550C may lie substantially flush with corrugated wall 320. In some embodiments, the outer portion of stiffener 550C and a portion of corrugated wall 320 forming the corrugation crest may have the same shape, such that an extended surface of stiffener 550C may lie against corrugated wall 320. In some embodiments, an inner portion of stiffener 550C may contact liner 340. In some alternative embodiments, an inner portion of stiffener 550C may not contact liner 340.

In some embodiments, the circular or oval-shaped cross-section of stiffener 550C may be hollow. In some alternative embodiments, the area within the cross-section of stiffener 550C may be filled with a filling material. In some embodiments, the filling material may be a non-plastic foam, such as polyurethane foam, high melt polyethylene, or aluminum foam. In some embodiments, the filling material may comprise two or more materials. The filling material may provide additional structural integrity to stiffener 550C.

In some embodiments, stiffeners 550A-550C may be secured within the corrugation crests by corrugated wall 320 and liner 340. Corrugated wall 320 and liner 340 may be secured together using known processes. The secure connection between corrugated wall 320 and liner 340 may hold stiffeners 550A-550C in place within the corrugation crests. In some embodiments, stiffeners 550A-550C may be retained in place because one or more portions thereof may abut one or more of corrugated wall 320 and liner 340, preventing stiffener movement. Alternatively or additionally, stiffeners 550A-550C may be secured to one or more of the corrugated wall 320 and liner 340 with an adhesive.

Figure 5D:
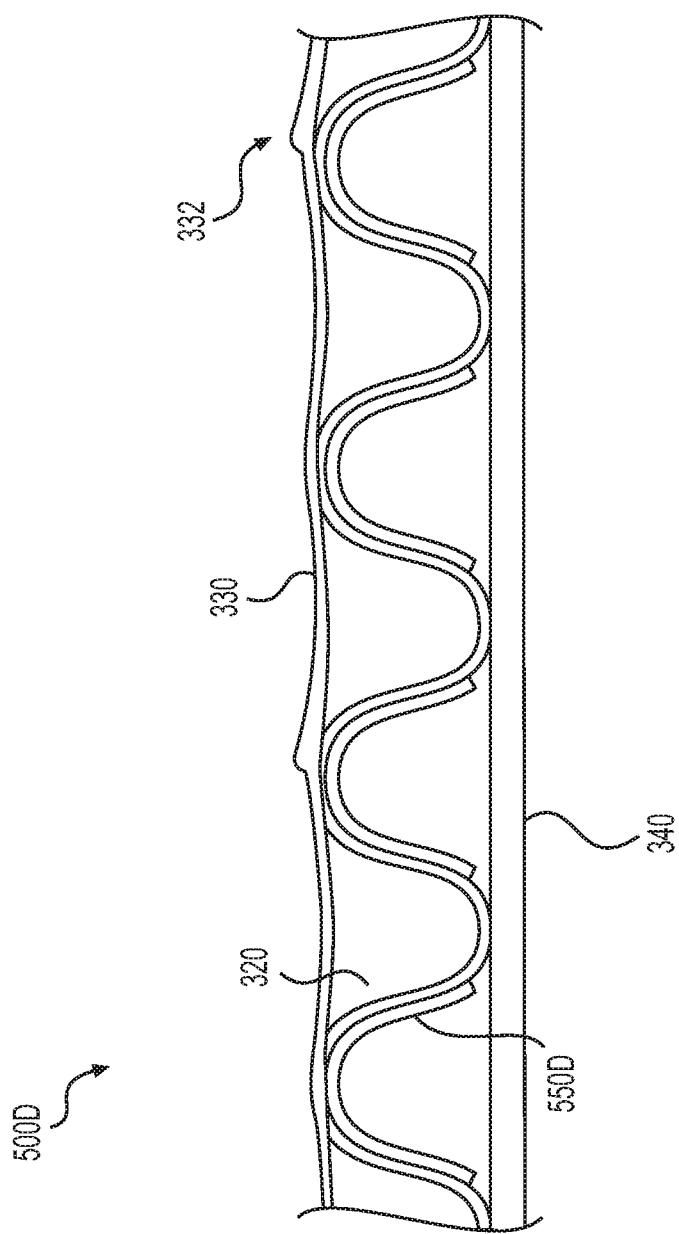

FIG. 5D illustrates an exemplary stiffener 550D according to some embodiments. Stiffener 550D may be a sheet of reinforcing material that lies flush with corrugated wall 320 within the corrugation crests. Accordingly, stiffener 550D and corrugated wall 320 may have the same profile such that they lie flush with each other. In some embodiments, stiffener 550D may have a rectangular or square-shaped cross-section. In some embodiments, the inner ends of stiffener 550D may contact liner 340. In some alternative embodiments, the inner ends of stiffener 550D do not contact liner 340, and instead may contact opposite portions of corrugated wall 320.

In some embodiments, stiffener 550D may be secured within the corrugation crests by virtue of having the same shape as corrugated wall 320. That is, stiffener 550D may be secured due to its flush contact with corrugated wall 320. Alternatively or additionally, stiffener 550D may be secured to one or more of corrugated wall 320 and liner 340 with an adhesive.

Stiffeners 550A-550D may be constructed of one or more materials. In some embodiments, stiffeners 550A-550D may be constructed of a plastic material, such as PVC and/or thermosetting resins. Alternatively or additionally, stiffeners 550A-550D may be constructed of one or more non-plastic materials, such as steel, fiberglass, aluminum, tin, copper, rubber, and/or wood. Exemplary materials may provide stiffeners 550A-550D with structural integrity such that stiffeners 550A-550D do not flex or deform when sustaining forces from inside or outside of the pipe. Additionally, stiffeners 550A-550D may be configured and constructed so as to not tear or puncture liner 340 or corrugated wall 320.

In some embodiments, one of stiffeners 550A-550D may be positioned within the corrugation crests of corrugated wall 320, after which time some or all of the corrugation crests may be at least partially filled with a filling material, thereby surrounding exposed portions of stiffeners 550A-550D. Alternatively, the filling material may be added first to the corrugation crests, after which time stiffeners 550A-550D may be positioned. For example, according to the embodiment depicted in FIG. 5B, filling material 555B may fill the area within the corrugation crest not occupied by stiffener 550B. In some embodiments, the filling material may be a non-plastic foam, such as polyurethane foam, high melt polyethylene, or aluminum foam. In some embodiments, the filling material may comprise two or more materials. The filling material may render stiffeners 550A-550D and the corrugation crests better able to withstand internal and external forces. Additionally, the filling material may aid in further securing stiffeners 550A-550D within the corrugation crests.

In some embodiments, corrugated wall 320 may form spiral corrugations or helical corrugations. This may result in the corrugation crests, the corrugation valleys, and one of stiffeners 550A-550D also spiraling around the circumference of the pipe. In some embodiments, the pipe may include a single corrugation crest and a single corrugation valley, each of which may spiral around the circumference of the pipe along the entire longitudinal length thereof. In some alternative embodiments, the pipe may include a plurality of corrugation crests and a plurality of corrugation valleys. Stiffeners 550A-550D may be helical or spiraling structures that may be placed within one or more spiraling corrugation crests of the pipe. In some embodiments, a single spiraling stiffener 550A-550D may be placed within each corrugation crest. Each stiffener 550A-550D may extend along the entire longitudinal length of the pipe or along a portion of the longitudinal length of the pipe. In other embodiments, one or more spiraling stiffeners 550A-550D may be placed within each corrugation crest. The one or more stiffeners 550A-550D may extend along the same longitudinal portion of the pipe or along different longitudinal portions of the pipe. In yet other embodiments, spiraling stiffeners 550A-550D may be placed in a subset, and not all, of the corrugation crests.

In some embodiments, corrugated wall 320 may form annular corrugations. According to these embodiments, stiffeners 550A-550D may include a plurality of annular stiffeners, each of which may be placed within a single corresponding corrugation crest. In some embodiments, a single stiffener 550A-550D may be placed within each corrugation crest. In other embodiments, one or more stiffeners 550A-550D may be placed within each corrugation crest. In yet other embodiments, stiffeners 550A-550D may be placed in a subset, and not all, of the corrugation crests.

Exemplary pipe profiles 500A-500D may be manufactured according to various embodiments explained above. In some embodiments, one of stiffeners 550A-550D may be positioned within the corrugation crests, after which time liner 340 may be applied to corrugated wall 320. In some alternative embodiments, one of stiffeners 550A-550D may be positioned upon liner 340, after which time liner 340 may be applied to corrugated wall 320 and stiffener 550A-550D placed into the corrugation crests. Liner 340 and corrugated wall 320 may be secured using known processes. In some embodiments, third wall 330 may be applied and configured to span the corrugation crests of corrugated wall 320 before, during, or after assembly of corrugated wall 320, liner 340, and stiffener 550A-550D. Third wall 330 may be applied according to various embodiments described above.

According to some embodiments in which stiffeners 550A-550D are spiraling or helical structures, positioning of one or more stiffeners 550A-550D may include threading one or more stiffeners 550A-550D along corrugation wall 320 until it is correctly positioned within the corrugation crests. Alternatively, placement of one or more stiffeners 550A-550D may include forming, deforming, or otherwise fitting one or more stiffeners 550A-550D into place within the corrugation crests. Alternatively, one or more stiffeners 550A-550D may be placed within the corrugation crests using other techniques.

According to some embodiments in which one or more stiffeners 550A-550D and the corrugations of corrugated wall 320 are annular, one or more stiffeners 550A-550D may be formed, deformed, or otherwise fitted into place within the corrugation crests. In some embodiments in which one or more stiffeners 550A-550D form an annular structure about the circumference of the pipe, the ends of one or more stiffeners 550A-550D may be joined to form a complete annular structure that may span the entire pipe circumference.

Liner 340 may be placed and configured to contact and span the troughs of the corrugation valleys of corrugated wall 320. According to some embodiments, liner 340 may be applied to contact and span at least a portion of one or more stiffeners 550A-550D. Liner 340 may be applied to completely cover the corrugation crests, thereby encasing one or more stiffeners 550A-550D within the corrugation crests. In some embodiments, after placement of one or more stiffeners 550A-550D within the corrugation crests and before application of liner 340, filling material may be applied within some or all of the corrugation crests. In some alternative embodiments, filling material may be placed within the corrugation crests, after which the one or more stiffeners 550A-550D may be placed and liner 340 may be applied.

The specification describes a pipe with one or more stiffeners. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A pipe comprising:
an axially extended bore defined by a corrugated outer wall having axially adjacent, outwardly-extending corrugation crests connected by corrugation valleys;
an outer wrap applied to the outer wall, the outer wrap spanning the corrugation crests and producing a smooth outer surface, wherein the outer wrap contacts at least a portion of the outer wall and does not contact a trough of the at least one corrugation valley; and
at least one stiffener positioned within at least one corrugation valley, wherein the at least one stiffener reinforces the trough of the at least one corrugation valley.

2. The pipe of claim 1, wherein the at least one stiffener extends between the outer wrap and the trough of the at least one corrugation valley.

3. The pipe of claim 1, wherein the at least one stiffener comprises:
an outer portion in contact with the outer wrap;
an inner portion positioned within the trough of the at least one corrugation valley; and
a middle portion extending between the outer portion and the inner portion,
wherein the inner portion is wider than the middle portion and narrower than the outer portion.

4. The pipe of claim 1, wherein the at least one stiffener comprises:
an outer portion in contact with the outer wrap; and
an inner portion extending between the outer portion and the trough of the at least one corrugation valley,
wherein the outer portion is wider than the inner portion.

5. The pipe of claim 1, wherein the at least one stiffener has an oval-shaped cross-section.

6. The pipe of claim 1, wherein the at least one stiffener has a circular cross-section.

7. The pipe of claim 1, wherein the at least one stiffener is hollow and is at least partially filled with a filling material.

8. The pipe of claim 1, wherein the at least one stiffener extends along at least a portion of the corrugated outer wall within the at least one corrugation valley.

9. The pipe of claim 1, wherein the at least one stiffener comprises a filling material which at least partially fills the at least one corrugation valley.

10. The pipe of claim 9, wherein the filling material comprises one or more of polyurethane foam, high melt polyethylene, or aluminum foam.

11. The pipe of claim 1, wherein the at least one stiffener is constructed of one or more of steel, PVC, thermosetting material, or fiberglass.

12. The pipe of claim 1, wherein one or more stiffener is configured within each corrugation valley.

13. The pipe of claim 12, wherein the corrugation valleys and one or more stiffeners extend helically along a longitudinal axis of the bore.

14. The pipe of claim 12, wherein the corrugation valleys and one or more stiffeners extend annularly around a circumference of the pipe.

15. A method of reinforcing a pipe comprising:
receiving a corrugated pipe having axially adjacent, outwardly-extending corrugation crests connected by corrugation valleys;
positioning at least one stiffener within at least one corrugation valley; and
applying an outer wrap to span and contact the corrugation crests and to cover the at least one stiffener, wherein the outer wrap does not contact a trough of the at least one corrugation valley.

16. The method of claim 15, wherein applying the outer wrap comprises:
determining a wrap type to be applied to the corrugated pipe;
determining a flow rate for applying a wrap of the wrap type based on a type of plastic used in the wrap, a type of fiber used in the wrap, and the wrap type; and
applying a wrap, having a smooth outer surface, made of the type of fiber and the type of plastic to the corrugated pipe using the determined flow rate.

17. The method of claim 15, wherein positioning the at least one stiffener comprises positioning the at least one stiffener within the trough of the at least one corrugation valley.

18. The method of claim 17, wherein applying the outer wrap comprises applying the outer wrap to the at least one stiffener.

19. The method of claim 15, wherein positioning the at least one stiffener comprises at least partially filling the at least one corrugation valley with filling material.

20. The method of claim 15, wherein positioning the at least one stiffener comprises positioning at least one stiffener within each corrugation valley.

21. A pipe comprising:
an axially extended bore defined by a corrugated outer wall having axially adjacent, outwardly-extending corrugation crests connected by corrugation valleys;
an outer wrap applied to the outer wall, the outer wrap spanning the corrugation crests and producing a smooth outer surface; and
at least one stiffener positioned within at least one corrugation valley, wherein the at least one stiffener reinforces a trough of the at least one corrugation valley and wherein the at least one stiffener comprises:
an outer portion in contact with the outer wrap,
an inner portion positioned within the trough of the at least one corrugation valley, and
a middle portion extending between the outer portion and the inner portion, wherein the inner portion is wider than the middle portion and narrower than the outer portion.

22. A pipe comprising:
an axially extended bore defined by a corrugated outer wall having axially adjacent, outwardly-extending corrugation crests connected by corrugation valleys;
an outer wrap applied to the outer wall, the outer wrap spanning the corrugation crests and producing a smooth outer surface; and
at least one stiffener positioned within at least one corrugation valley, wherein the at least one stiffener reinforces a trough of the at least one corrugation valley and wherein the at least one stiffener is hollow and is at least partially filled with a filling material.

23. A method of reinforcing a pipe comprising:
receiving a corrugated pipe having axially adjacent, outwardly-extending corrugation crests connected by corrugation valleys;
positioning at least one stiffener within at least one corrugation valley; and
applying an outer wrap to span the corrugation crests and to cover the at least one stiffener, wherein applying the outer wrap comprises:
determining a wrap type to be applied to the corrugated pipe;
determining a flow rate for applying a wrap of the wrap type based on a type of plastic used in the wrap, a type of fiber used in the wrap, and the wrap type; and
applying a wrap, having a smooth outer surface, made of the type of fiber and the type of plastic to the corrugated pipe using the determined flow rate.

* * * * *